May 9, 1933.  E. V. TAYLOR  1,908,462
BRAKE
Filed July 23, 1930
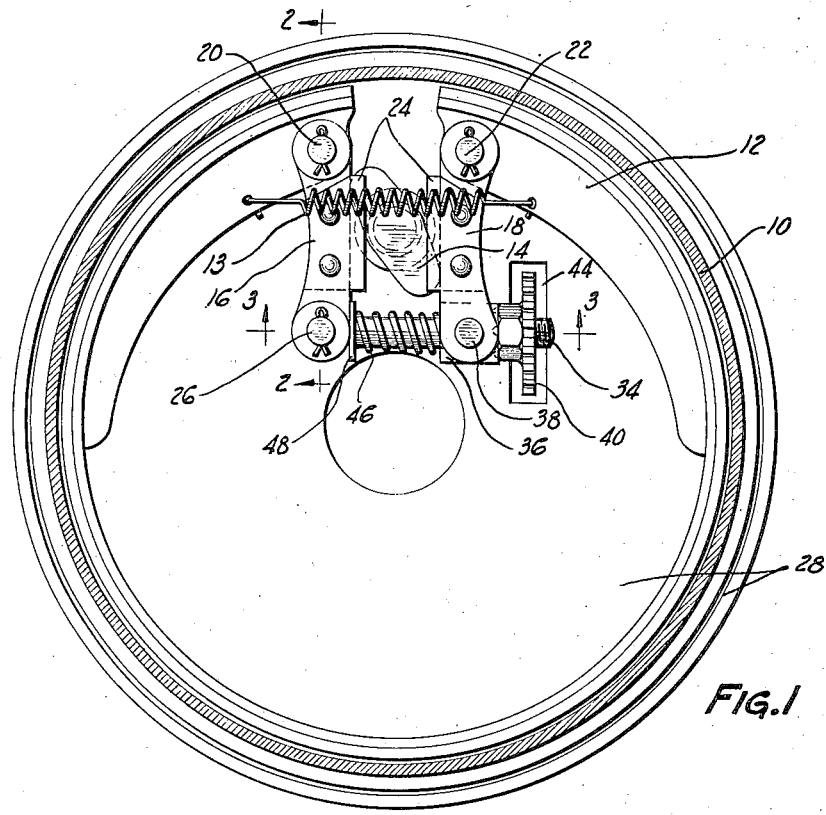
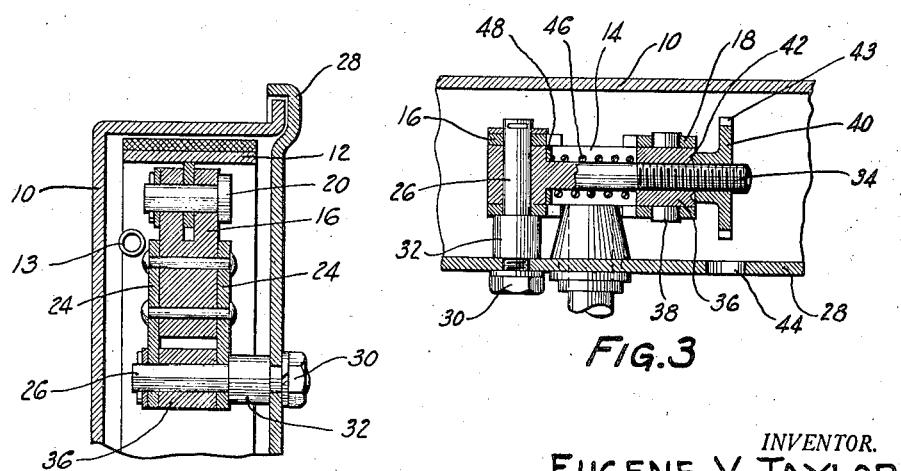
INVENTOR.
EUGENE V. TAYLOR
BY  M. W. McConkey
ATTORNEY Patented May 9, 1933

1,908,462

UNITED STATES PATENT OFFICE

EUGENE V. TAYLOR, OF CHICAGO, ILLINOIS, ASSIGNOR TO BENDIX BRAKE COMPANY, OF SOUTH BEND, INDIANA, A CORPORATION OF ILLINOIS

BRAKE

Application filed July 26, 1930. Serial No. 470,797.

This invention relates to brakes and is herein illustrated as embodied in an internal expanding brake of a type especially suited to automobiles.

An object of the invention is to provide an applying linkage that may be easily adjusted for wear, for example, by providing the friction means or brake shoes with a novel arrangement of adjustable pivoted links that directly contact with the brake actuating device or cam.

In one desirable arrangement, the links are pivotally connected to the brake shoes and to each other to form a pair of separated hinge thrust receiving members between which is the well-known operating cam. One of the links preferably has its lower end pivotally supported on a stationary part of the brake, such as the backing plate and the other link supported by an eyebolt or the like slidably engaging a trunnion pivotally secured to the lower end of the link. Each link has its upper end pivotally secured to one of the spaced ends of the friction band, so that the four pivotal points define substantially a parallelogram having one of its corners pivotally secured to the backing plate.

One end of the eyebolt in the illustrated embodiment is threaded and has a notched wheel engaged therewith which may be rotated through a suitable opening in the backing plate for adjusting the position of the slidable link. A compression spring surrounds the eyebolt and urges the trunnion outwardly against the adjusting screw, interengaging notches being provided on both the trunnion and notched wheel to both retain the adjusting screw in position and to provide a gauge for indicating the amount of adjustment. Various features of novelty relate to the linkage and means for adjusting the relation of the links relative to the actuating cam.

The above and other objects and features of the invention, including various novel arrangements of parts and desirable construction, will be apparent from the following description of one illustrative embodiment of the invention shown in the accompanying drawing, in which:

Figure 1 is a vertical section through the brake shoe inside the head of the brake drum showing the brake and novel linkage in side elevation;

Figure 2 is a section on line 2—2 of Figure 1 showing the anchorage; and

Figure 3 is a sectional view taken on line 3—3 of Figure 1 showing the trunnion and adjusting wheel.

In the illustrative embodiment shown in the drawing, 10 is a brake drum within which is a friction member or band 12 having adjacent ends which are held in their idle position by spring 13 and expanded into engagement with the drum by means of a cam 14. The engagement of the cam with the friction band is accomplished through the intermediary of a pair of links 16 and 18, each of which is pivotally mounted to one end of the band 12 at 20 and 22 respectively. Each link is provided with a thrust face and a pair of guide members or plates 24 riveted to opposite sides of the links and engaging the side faces of the cam 14 to hold the brake shoes against axial movement. The lower end of link 16 is pivotally mounted on a stud 26 secured to the backing plate 28 by any desired means, such as nut 30, an enlarged portion 32 being provided between the link and backing plate to locate the band within the drum. An eyebolt 34 having a threaded end is also pivotally mounted on stud 26 between the extended portions of plates 24 and has its outer end engaged by a trunnion 36 slidable upon the eyebolt and having journals 38 that pivotally engage the extended side plates of link 18. Trunnion 36 is provided with a series of serrations or notches 42 normally engaging a similar set of serrations or notches formed on the adjusting wheel 40 which preferably has projections 43 on its periphery that may be engaged by any suitable instrument inserted through an opening 44 provided in the backing plate.

A compression spring 46 surrounds the eyebolt, collar 48 being interposed between it and the end of the bolt at one end, and the spring being arranged to urge the trunnion 36 and link 18 outwardly against the adjusting wheel 40. It may be seen that the above described arrangement provides an adjustable linkage for the brake band 12 which has four pivotal points substantially defining a rectangle, one corner of which is anchored to the backing plate by the stud 26.

If, during the life of the brake, it should be found that the brake band has become worn, an adjustment may be readily made by turning the adjusting wheel 40 and slidably move link 18 on the eyebolt 34 toward the opposite link 16. The spring 46 will, at all times, urge link 18 outwardly and cause the mating serrations on the trunnion and adjusting wheel 40 to remain in engagement until manually moved to another adjusted position.

While I have illustrated and described one embodiment of the invention, it is to be understood that this showing and description is illustrative only, and that I do not desire to limit the invention to the embodiment shown and described or otherwise except by the terms of the following claims.

I claim:

1. A brake comprising a support, a drum associated therewith, friction means on the support for engaging the drum, a pair of links each having one end pivotally secured to the friction means and their other ends pivoted to a connection therebetween, one of said links being pivotally connected to the support, and operating means between the links.

2. A brake comprising a support, a drum associated therewith, friction means on the support for engaging the drum, a pair of links each having one end pivotally secured to the respective ends of the friction means and their other ends pivotally connected to a connection therebetween, one of said links being pivotally connected to the support, thrust faces on said links, and spreading means engaging the thrust faces.

3. A brake comprising a support, a drum associated therewith, a friction band on the support for engaging the drum, a pair of links each having one end pivotally secured to the ends of the band and their other ends pivotally connected to a connection therebetween, one of said links having a pivotal connection to the support, and means to spread the links and actuate the brake.

4. A brake comprising a support, a drum associated therewith, friction means on the support for engaging the drum having separable ends, an anchor on the support, a link having one end pivotally connected to one end of the friction means and its other end connected to the anchor, a second link having one end pivotally connected to the other end of the friction means and its other end provided with a transverse member connecting it to the anchor, and means between the links to spread the links and apply the brake.

5. A brake comprising a support, a drum associated therewith, friction means on the support for engaging the drum having separable ends, an anchor on the support, a link pivotally connecting one end of the friction means to the anchor, a second link on the other end of the friction means pivotally connected through a movable joint to the anchor, and means to spread the links and apply the brake.

6. A brake comprising a brake band having separable ends, a pair of links each having one end pivoted to the separable ends, means pivotally connecting the other ends of the links and means positioned between the links intermediate their ends to spread the links and apply the brake.

7. A brake comprising a support, a brake band on the support having separable ends, a pair of links each having one end pivoted to the respective ends of the band, means on the support pivotally connecting the other ends of the links with their body portions in spaced relation, and means to spread the links and apply the brake.

8. A brake comprising a support, a drum, friction means for engaging the drum having adjacent ends, a link secured to each of said ends, said links having pivotal connections with the support, one of said links being slidable toward and from the other link, means for limiting the outward movement of the slidable link, and means to spread the links to apply the brake.

9. A brake comprising a support, a drum, friction means having adjacent ends for engaging the drum, a tension member pivotally mounted on the support, a link secured to each end of the friction means, one of said links pivotally secured to the support, the other of said links having a slidable mounting on the tension member, means limiting the outward movement of the slidable link and means to spread the links and apply the brake.

10. A brake comprising a support, a friction member anchored to the support by a pair of links, one of which is slidably mounted on a member pivotally secured to the support, an adjustable stop for the slidable link, and means to spread the links to apply the brake.

11. A brake comprising a support, a friction member anchored to the support by a pair of links, one of which is slidably mounted on a member pivotally secured to the support, an adjustable stop for the slidable link, means to urge the link against the stop, and means to spread the links to apply the brake.

12. A brake comprising a support, a friction member having adjacent ends, an anchor on the support, a link pivotally connecting one end of the friction member to the anchor, a guide pin pivoted to the anchor, a trunnion member on the pin, an adjustable stop for the trunnion, a link pivotally connecting the other end of the friction member to the trunnion, and means to spread the links and apply the brake.

13. A brake comprising a support, a friction member having adjacent ends, an anchor on the support, a link pivotally connecting one end of the friction member to the anchor, a guide pin pivoted to the anchor, a trunnion member on the pin having projections, an adjustable stop for the trunnion having corresponding projections, a link pivotally connecting the other end of the friction member to the trunnion, means urging the trunnion against the stop, and means to spread the links and apply the brake.

14. A combined brake applying and anchoring device comprising a pair of links adapted to pivotally engage an anchor, said links being pivotally connected by a guide pin having a limited slidable connection to one link.

In testimony whereof, I have hereunto signed my name.

EUGENE V. TAYLOR.